3,019,191
STABILIZED HYDRAULIC FLUID COMPOSITION
Neal W. Furby, Berkeley, and Charles D. Newnan, Jr., San Pablo, Calif., assignors to California Research Corporation, San Francisco, Calif., a corporation of Delaware
No Drawing. Filed Sept. 28, 1954, Ser. No. 458,957
2 Claims. (Cl. 252—78)

This invention relates to new and improved hydraulic fluid compositions. More particularly, the invention is concerned with novel organo-silicon compound mixtures possessing improved stability which makes them superior hydraulic fluids.

Hydraulic fluids, in addition to their lubricating qualities, should possess special properties such as good viscosity-temperature relationships involving small viscosity changes over wide temperature changes, shear resistance, hydrolytic stability, low volatility and last, but not least, oxidation-corrosion stability. Unless the hydraulic fluid is capable of flowing under all conditions through the many restricted passages characteristic of hydraulic equipment and other types of apparatus for which such compositions are commonly used, the composition is altogether ineffective, regardless of how many of the aforementioned special properties it may possess.

In our copending application Serial No. 377,240, filed August 28, 1953, and now abandoned, of which this application is a continuation-in-part, novel hydraulic fluid compositions based on a blend of alkyl silicone and an alkyl silicate or disilicate are shown to possess all of the desirable attributes enumerated above. Although these compositions are unusually good and far superior to hydraulic fluids previously employed, it is desirable in many circumstances to improve their oxidation-corrosion stability.

Unfortunately, when this is done by the addition of a conventional oxidation inhibitor such as the diaryl amines illustrated by phenyl-α-naphthylamine, it is found that a substantial amount of sludge results when the composition is subjected to oxidative conditions such as those encountered in actual operations. This sludge seriously impedes the flow of the hydraulic fluid and may result in complete stoppage, thus rendering the composition useless, as mentioned above, irrespective of its otherwise excellent quality.

We have now found that an improved hydraulic fluid composition possessing all of the above special properties plus good oxidation and corrosion stability may be prepared consisting essentially of from about 85 to 97% by weight of at least one member of the group consisting of tetra-alkyl silicates and hexa-alkyl disilicates having alkyl groups of 1 to 18 carbon atoms each, from about 3 to 15% by weight of a dialkyl silicone polymer having alkyl groups of from 1 to 5 carbon atoms each and a viscosity of at least 1000 centistokes at 77° F. and about 0.1 to 5.0% by weight of a secondary diaryl amine having from 8 to 24 carbon atoms in alkyl groups positioned on the aromatic nuclei.

The hydraulic fluid compositions of the invention as described above are unusually stable and do not deteriorate under oxidation to form sludge and gums which would prevent the proper functioning of hydraulic equipment and the like. There is also little increase in viscosity of the compositions due to oxidation, thus providing better flow of the materials in use through the restricted passages commonly encountered. Corrosivity of the compositions due to the products of oxidative deterioration is also maintained at a very low level.

The tetra-alkyl silicates and hexa-alkyl disilicates of the hydraulic fluid compositions according to the invention may be illustrated by the following general formula:

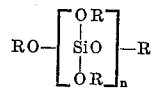

in which $n$ is an integer having a value of 1 or 2 and the R's represent alkyl groups of from 1 to 18 carbon atoms each which may be the same as or different from one another. Preferred alkyl groups for present purposes are the branched-chain alkyl groups of from 5 to 8 carbon atoms, since they possess superior properties such as hydrolytic stability.

Specific examples of the tetra-alkyl silicates and hexa-alkyl disilicates include tetraethyl silicate, tetra(2-butyl) silicate, hexa(n-butyl)disilicate, tetra(n-octyl)silicate, as well as those silicates derived from secondary or tertiary alcohols and having the preferred structure indicated above such as tetra(2-methyl-1-butyl)silicate, tetra(2-methyl-2-butyl)silicate, tetra(2-hexyl)silicate, tetra(2-ethyl-1-butyl)silicate, tetra(2-heptyl)silicate, tetra(2-octyl)silicate, tetra(2-ethyl-1-hexyl)silicate and the corresponding hexa-alkyl disilicates such as hexa(2-ethylbutoxy)disiloxane and the like.

The dialkyl silicone polymer of the hydraulic fluid compositions of the invention may be illustrated by the general formula:

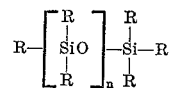

in which $n$ is an integer having a value of at least 1, and the R's are alkyl groups of from 1 to 5 carbon atoms each. These dialkyl silicone polymers have a viscosity of at least 1000 centistokes at 77° F. The preferred dialkyl silicones for present purposes are those having viscosities between about 60,000 and 2½ million centistokes at 77° F. They may be either branched chain or straight chain in configuration and may incorporate various cross-linkages, as is clearly understood in the silicone art. The essential physical characteristic of these polymers is that they are soluble in the alkyl silicate and alkyl disilicate component of the compositions to the extent of at least 3% by weight. Representative silicones of the aforementioned type include dimethyl silicone, diethyl silicone, methylethyl silicone, dipropyl silicone, dibutyl silicone, diamyl silicone, methylbutyl silicone and methylamyl silicone.

The secondary diarylamines of the compositions according to the invention may be illustrated by the following formula:

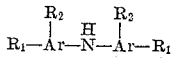

in which Ar is an aryl group such as benzene or naphthalene and the $R_1$'s and $R_2$'s are members of the class consisting of hydrogen, alkyl, aralkyl and alkaryl groups of from 1 to 16 carbon atoms, said $R_1$'s and $R_2$'s containing a total of from 8 to 24 carbon atoms. Preferred secondary diarylamines are those containing at least one mononuclear aryl or phenyl group. Very effective inhibitors of these types include p,p'-dioctyldiphenylamine, octylated phenyl-α-naphthylamine (phenyl-α-naphthylamine alkylated with diisobutylene in a 1:1 to 3:1 molar ratio) and octylated arylalkylated diphenylamine (diisobutylene and styrene reacted with diphenylamine under conventional alkylation conditions). Other examples of similar types include dibutyldiphenylamine, butyloctyldiphenylamine, dioctylphenyl-α-naphthylamine, tributylphenylethyldiphenylamine, trioctylphenyl - α - naphthylamine, etc.

In further illustration of the compositions according to this invention, the following examples and tests are submitted. Unless otherwise stated, the proportions are given on a weight basis.

Example 1

Seven parts of methylethyl silicone polymer having a viscosity of about 136,000 centistokes at 77° F. was mixed with 92 parts of hexa(2-ethylbutoxy)disiloxane. One part of phenyl-α-naphthylamine was added to the composition as oxidation inhibitor. The resulting blend was an excellent hydraulic fluid having an ASTM slope of 0.36 between 100 and 210° F.

Example 2

93.98 parts of hexa(2-ethylbutoxy)disiloxane was mixed with 5 parts of methylethyl silicone polymer having a viscosity of 124,000 centistokes at 77° F. One part of phenyl-α-naphthylamine was added as an oxidation inhibitor and 0.02 part of quinizarin was added as a copper deactivator. This composition was an excellent hydraulic fluid having viscosity-temperature characteristics as described above and was not adversely affected by the presence of copper during oxidation tests.

Example 3

Seven parts of methylethyl silicone polymer having a viscosity of 136,000 centistokes at 77° F. was mixed with 91.8 parts hexa(2-ethylbutoxy)disiloxane. To the mixture was added 0.2 part of phenyl-α-naphthylamine as oxidation inhibitor and 1 part of 1,2-epoxy-3-phenoxypropane as sludge solubilizing agent. This composition was an excellent hydraulic fluid possessing the same desirable viscosity-temperature characteristics of the compositions according to the previous examples.

Example 4

93.98 parts of hexa(2-ethylbutoxy)disiloxane was mixed with 5 parts of methylethyl silicone polymer having a viscosity at 77° F. of 174,000 centistokes. To this mixture was added 1 part octylated styrenylated diphenylamine and 0.02 part of quinizarin. The resulting composition possessed excellent viscosity-temperature characteristics and was inactive to copper, making it a very desirable hydraulic fluid.

Example 5

Five parts of methylethyl silicone polymer having a viscosity of 124,000 centistokes at 77° F. was mixed with 93.98 parts of hexa(2-ethylbutoxy)disiloxane, 1 part of dioctyldiphenylamine and 0.02 part of quinizarin. This mixture was inactive toward copper and possessed excellent viscosity-temperature characteristics which made it particularly suitable for use as hydraulic fluid.

Example 6

93.28 parts of hexa(2-ethylbutoxy)disiloxane was mixed with 4.7 parts of ethylmethyl silicone polymer having a viscosity of 124,000 centistokes at 77° F. As an oxidation inhibitor, to this mixture was added 2 parts of octylated phenyl-α-naphthylamine obtained by reacting 3 moles of diisobutylene with 1 mole of phenyl-α-naphthylamine under conventional alkylation conditions. 0.02 part of quinizarin was added as a copper deactivator. As in the case of previous compositions, this material was an excellent hydraulic fluid.

Example 7

93.3 parts of hexa(2-ethylbutoxy)disiloxane was mixed with 4.7 parts of methylethyl silicone polymer having a viscosity of 124,000 centistokes at 77° F. To this mixture, for purposes of oxidation inhibition, was added 2 parts of octylated phenyl-α-naphthylamine obtained by alkylating 1 mole of phenyl-α-naphthylamine with 2 moles of diisobutylene. This material was an excellent hydraulic fluid of the type described in the above examples.

The illustrative compositions of the prior art and those of the present invention as described above were tested in a series of tests to determine their stability to oxidation in the presence of various metals which are known to act as catalysts. These tests were primarily designed to observe the amount of sludge formed in the compositions. The method was essentially the same as that described in Federal Specification VV–L–791e, Method 5308.3. In the tests air was passed at a rate of 5 liters per hour through 100 ml. of the hydraulic fluid composition for 72 hours. The temperature was maintained at 400° F. Aluminum, steel, beryllium-copper and silver metal strips were added as catalysts. At the end of the 72-hour period the composition was inspected for appearance. If no sludge was formed, the fluid was entirely clear. Moderate sludge was indicated by a hazy appearance, while visible precipitate in the fluid showed that the composition was unsatisfactory because of instability to oxidation and sludging. Results of the tests were as set out in the following table.

TABLE

| Example | Oxidation Inhibitor | Other Additives | Appearance of Fluid |
|---|---|---|---|
| 1 | 1% phenyl-α-naphthylamine. | None | Precipitate. |
| 2 | ...do... | 0.02% quinizarin | Do. |
| 3 | 0.2% phenyl-α-naphthylamine. | 1% 1,2-epoxy-3-phenoxypropane. | Do. |
| 4 | 1% octylated styrenylated diphenylamine. | 0.02% quinizarin | Clear. |
| 5 | 1% dioctyldiphenylamine. | ...do... | Do. |
| 6 | 2% trioctylated phenyl-α-naphthylamine. | ...do... | Do. |
| 7 | 2% dioctylated phenyl-α-naphthylamine. | None | Do. |

The above tests show that the novel silicate-silicone compositions of the present invention possess vastly superior resistance to oxidation and sludging compared to previously known compositions of the same type. Although the alkyl silicate and silicone polymer compositions are unusually effective hydraulic fluids of themselves, the above tests show that it may be desirable under certain conditions to improve their stability to oxidation. Surprisingly, it is not enough to add oxidation inhibitors of the conventional type such as diarylamines, since these materials are shown to be entirely ineffective in the prevention of sludge. On the other hand, when the secondary diarylamines having 8 to 24 carbon atoms in alkyl groups positioned on the aromatic nuclei are added as in the compositions of the present invention, hydraulic fluids are obtained which are able to resist oxidation and hold up during the entire period of tests without formation of any perceptible sludge.

We claim:

1. A non-sludging hydraulic fluid composition consisting essentially of 85 to 97% by weight of hexa(2-ethylbutoxy)disiloxane, 3 to 15% by weight of methylethyl silicone having a viscosity between 60,000 and 2½ million centistokes at 77° F. and about 0.1 to 5.0% by weight of p,p'-dioctyldiphenylamine.

2. A non-sludging hydraulic fluid composition consisting essentially of 85 to 97% by weight of a hexa-alkoxy disiloxane having the formula

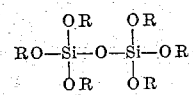

in which the R's are alkyl groups of from 5 to 8 carbon atoms each, 3 to 15% by weight of a dialkyl silicone polymer having alkyl groups of 1 to 5 carbon atoms each and a viscosity of at least 1,000 centistokes at 77° F. and about 0.1 to 5.0% by weight of a secondary diarylamine having the formula

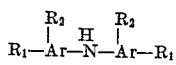

in which Ar is an aryl group selected from the class consisting of benzene and naphthalene groups and the $R_1$'s and $R_2$'s are members of the class consisting of hydrogen and alkyl groups, said secondary diarylamine having a total of from 8 to 24 carbon atoms in alkyl groups each containing from 1 to 16 carbon atoms positioned on the aromatic nuclei.

References Cited in the file of this patent

UNITED STATES PATENTS

| | | |
|---|---|---|
| 2,495,363 | Barry et al. | Jan. 24, 1950 |
| 2,530,769 | Hollis | Nov. 21, 1950 |
| 2,681,313 | Kather et al. | June 15, 1954 |
| 2,746,926 | Barry | May 22, 1956 |

FOREIGN PATENTS

| | | |
|---|---|---|
| 513,693 | Belgium | Sept. 15, 1952 |